E. L. EMERSON.
HEATER.
APPLICATION FILED NOV. 15, 1919.
1,367,952.
Patented Feb. 8, 1921.
2 SHEETS—SHEET 1.
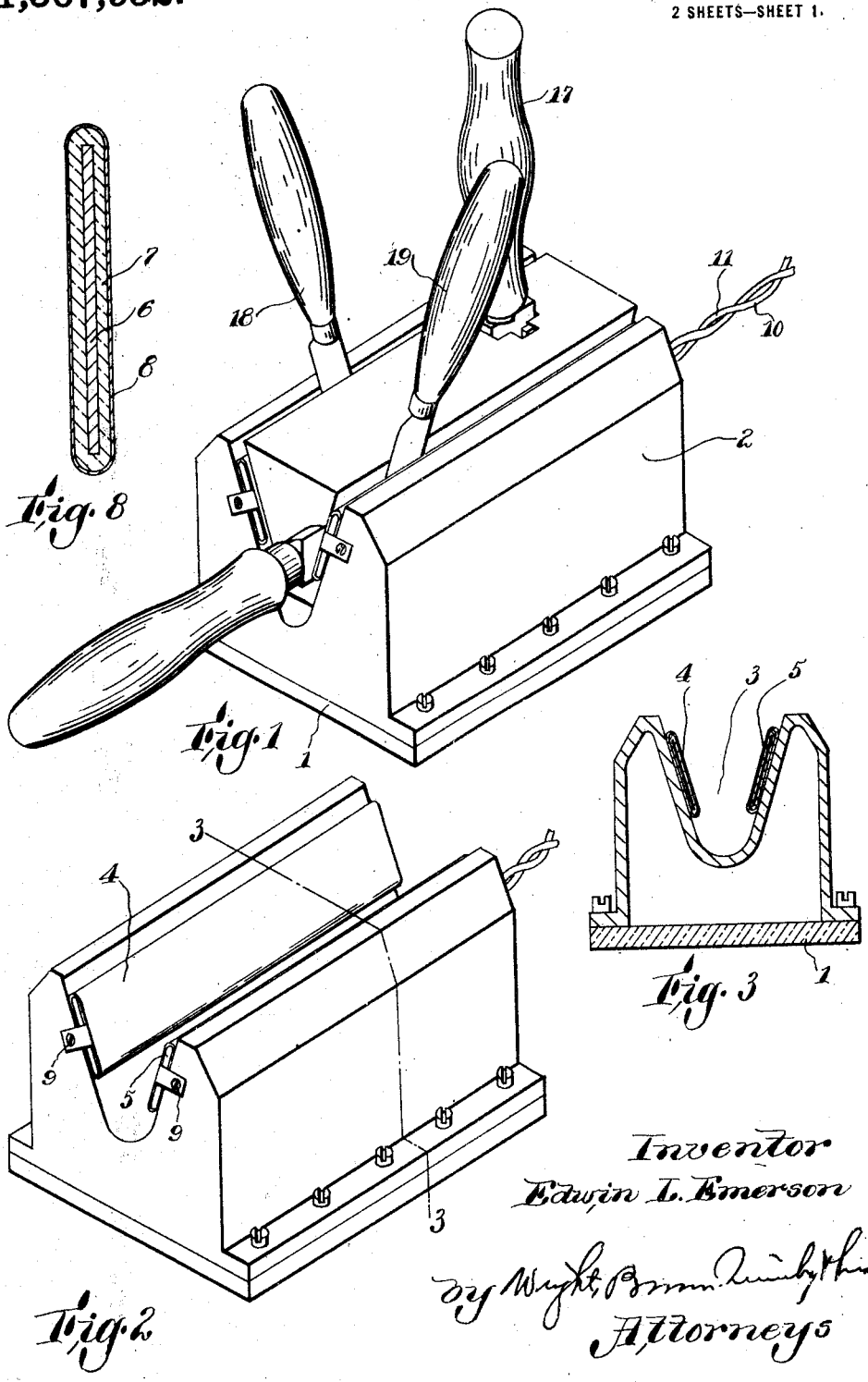
Inventor
Edwin L. Emerson
by Wright, Brown, Quinby & May
Attorneys E. L. EMERSON.
HEATER.
APPLICATION FILED NOV. 15, 1919.
1,367,952.
Patented Feb. 8, 1921.
2 SHEETS—SHEET 2.
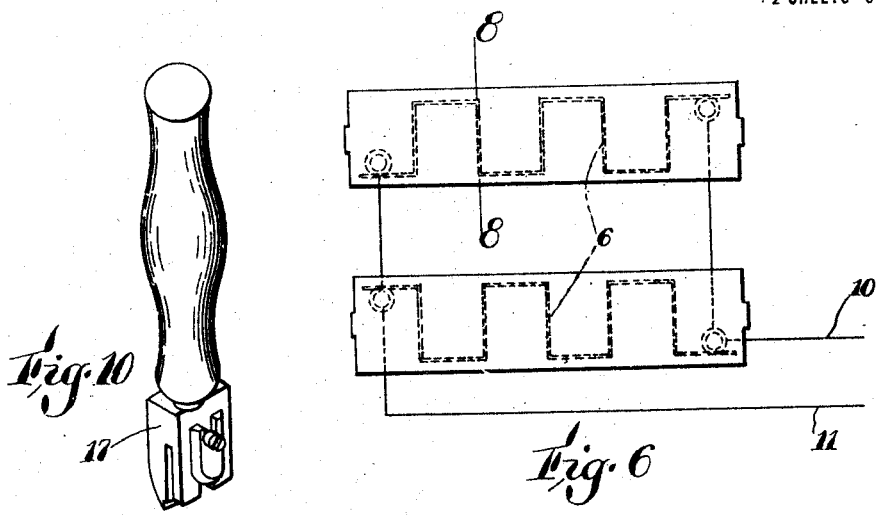
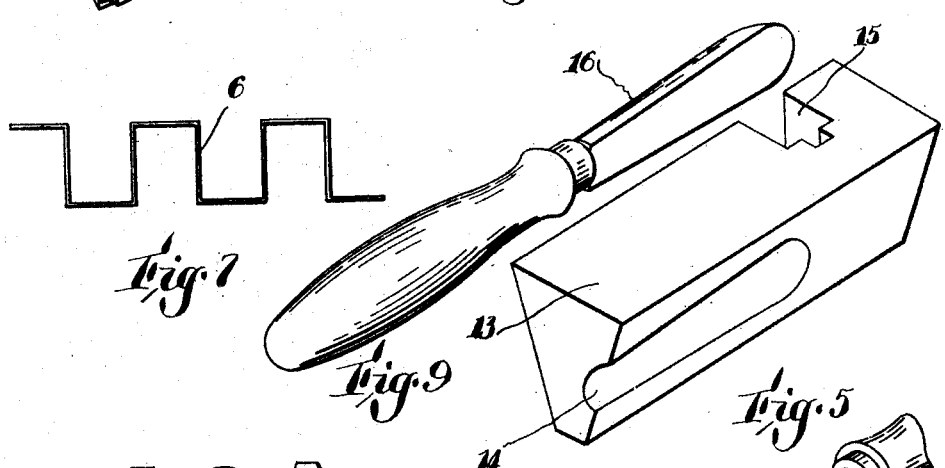
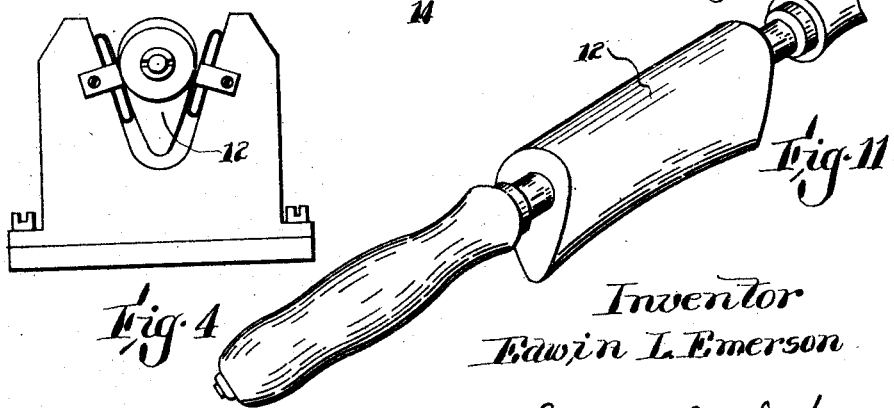
Inventor
Edwin L. Emerson
By Wright, Brown, Quinby & May
Attorneys

UNITED STATES PATENT OFFICE.

EDWIN L. EMERSON, OF BRAINTREE, MASSACHUSETTS.

HEATER.

1,367,952.   Specification of Letters Patent.   Patented Feb. 8, 1921.

Application filed November 15, 1919. Serial No. 338,345.

*To all whom it may concern:*

Be it known that I, EDWIN L. EMERSON, a citizen of the United States, residing at Braintree, in the county of Norfolk and State of Massachusetts, have invented new and useful Improvements in Heaters, of which the following is a specification.

The present invention is a heater which is intended particularly for heating tools used in the manufacture and repair of shoes, although it may be used for other specific purposes, all of which are included within the scope of the protection which I claim.

As best explaining the nature of the invention and the features in which it consists, attention is directed to the drawings furnished herewith, in which:

Figure 1 is a perspective view of the entire heater, arranged in condition for use to heat burnishing tools and knives used in shoe work.

Fig. 2 is a perspective view of the heater alone, with the tools and adapter removed.

Fig. 3 is a cross section of the heater, on line 3—3 of Fig. 2.

Fig. 4 is an end view of the heater.

Fig. 5 is a perspective view of an adapter which I have designed for use with the heater, and which in itself is a part of the invention.

Fig. 6 is a diagrammatic view illustrating the electrical circuit of the heating elements.

Fig. 7 is a fragmentary view of a portion of one of the electrical heating elements or units by which heat is generated in the heater.

Fig. 8 is a cross sectional view of the heating unit.

Figs. 9, 10 and 11 are persective views of different burnishing tools which the heater is adapted to heat quickly and effectively.

Like reference characters indicate the same parts in all of the figures.

The heater comprises a base 1, and a body or casing 2 mounted on said base. Said body is preferably hollow, and preferably, also, made as a metal casting, although it may be cast of other material than metal; or made of sheet material, metallic or otherwise. Preferably, however, I make it of cast aluminum, on account of the comparatively light weight and low heat-conductivity of that metal.

In the middle part of the body is a deep groove or valley 3, running its whole length, the sides of which are preferably inclined. On such inclined sides are mounted electrical heating units 4 and 5, of which I may employ any type, although I prefer the Cutler-Hammer unit. This unit contains a zigzag heating element 6, as shown in Figs. 6 and 7, which is packed in insulating material 7, as shown in Fig. 8, and is surrounded by a metallic cover 8. In dimensions, the unit is comparatively wide and thin, and it has flat sides, whereby it is well adapted to be mounted on the side walls of the channel 3 of my heater, since when the units are thus mounted ample space is left between them for the insertion of the tools or other things to be heated. The units are preferably as long as the body of the heater itself, and may be mounted thereon by lugs 9, at opposite ends, which are laid against the end walls of the body and attached thereto.

The heater, as thus constructed and equipped, may be supplied with current from any ordinary electric lamp socket or other source, by conductors such as 10 and 11, fragments of which are shown in Fig. 1, and the connections of which with the units are shown in diagram in Fig. 6. This diagrammatic showing is given simply for a complete illustration of operative means, and with the full understanding that any suitable sort of heating unit, connected in circuit with a source of current in any suitable way, may be used instead of the particular units and circuits here shown. The units might, for example, be placed in the hollow interior of the heater body, that is, on the opposite sides of the walls which define the channel 3. Whether placed in that way or as shown, however, the units are arranged at opposite sides of a space in which articles to be heated may be placed, and they are insulated in a large measure against loss of heat by the confined air in the open interior space of the body.

Any tool or other article not too wide to enter the channel 3 may be placed therein, and heated at the same time on both sides. This mode of use is illustrated in Fig. 4, where a burnishing iron 12 is placed in the channel in contact with both units. The channel, having inclined sides, is well adapted to take a tool of this sort, which is substantially wedge-shaped.

For enabling tools which are not wide enough to contact with both heating units to be efficiently heated, I provide an adapter 13, shaped conformably to the space between the heating units, and having, in one or both of the surfaces which lie next to the units when it is placed in the channel, recesses such as the longitudinal groove 14 or a transverse recess 15, shown in Fig. 5. The groove 14 is adapted to receive such a burnishing tool as the tool 16, shown in Fig. 9; and the recess 15 to take the edge setter shown in Fig. 10, or other tools of more or less similar form and dimensions. Also, very thin tools, such as knife blades, may be inserted between the unrecessed surfaces of the adapter and the heating units, as shown in respect to the knives 18 and 19 in Fig. 1.

The function of the adapter is two-fold, namely, first, to hold one side of the tool to be heated close against one of the heating units; and, second, to conduct heat from the other unit, or from both units, to the opposite side of the tool, the adapter being preferably made of iron or other metal having high heat conductivity, and preferably also, made as a solid mass. The adapter thus causes a much more rapid heating of the tool than could possibly take place if one side of the tool were exposed to an unconfined body of air, and also causes the tool to be heated to a higher temperature.

In this explanation, I have referred to a "tool" as typical of anything which may be heated by this heater, with or without the use of an adapter. Adapters may, of course, be constructed with provision for receiving articles of all sorts and shapes which are too narrow to span the space from one heating unit to the other. The groove or channel in the heater body may likewise be of any width, and its walls may have any inclination.

What I claim and desire to secure by Letters Patent is:

1. A tool heater comprising a body having an elongated open channel or valley adapted to be occupied by a tool of a form and width approximating those of the channel, and a plurality of heating elements mounted upon said body to extend along the opposite walls of said channel, there being one element adjacent to each wall, adapted to deliver heat at the same time to opposite sides of the tool being heated.

2. An electric heater, comprising a body having a base whereby it may be set on a support, and electrical heating units mounted on said base with an open space between them adapted to receive the thing to be heated in a position permitting flow of heat into different sides of the thing being heated from both units at once.

3. A heater, comprising an elongated body having in its upper side a lengthwise extending open groove or channel, and electrical heating units mounted at the opposite sides of said channel adjacent to the walls thereof and adapted to admit between them the articles to be heated.

4. A heater, comprising a body constructed as a hollow shell having a channel with distinct opposed sides, which channel is open at the top, and heating units arranged in said channel along the sides thereof.

5. An electric heater consisting of a body having a hollow interior, with a deep valley in one side having defining walls which are spaced apart and heat-insulated from the outer sides of the body by the interior space thereof, and electrical heating units mounted in close proximity to said defining walls and extending along the same.

6. A heater consisting of a body having a hollow interior and a deep external groove or valley in one side thereof, the defining walls of which are separated and heat-insulated from the outer sides of the body by the interior space thereof, and heating units mounted adjacent to each of the opposite walls of the valley and the exposed sides of said walls opposite from the adjacent interior spaces of the body.

7. A heater comprising a body having a broad base part and an open channel in its upper part to receive the thing to be heated, and flat elongated heating units secured to the body against each of the opposite sides of said channel, the exposed surfaces of said heating units defining the limits of the space within which the thing to be heated is received and being adapted to come into contact with a tool or other article which substantially fills such space.

8. The combination with a heater having oppositely arranged heating units with a space between them for the thing to be heated, of an adapter constructed to occupy the space between said units and to receive between it and one of the units an article to be heated which is not wide enough to span the space.

9. The combination with an electric heater having opposed heating units spaced apart, of an adapter made of heat-conducting material and formed to occupy the space between said units, and having provision for receiving between itself and one of the units an article which is too narrow to span such space.

10. The combination with an electric heater, consisting of a body having a channel with inclined sides in its top and heating units arranged along the walls of said channel, of an adjuster block of heat-conducting metal made to fit between said heating units and having a recess in one of its sides formed to admit in contact with one of the units an article to be heated.

11. The combination with an electric heater embodying the holding means and heating units arranged with a space between them, of an adapter constructed of metal to fit said space and thereby to receive heat from said units, said adapter having a recess to receive an article narrower than the space between said heating units.

12. The combination of a heater body having in its upper part an open trough-like channel with inclined opposite side walls, electrical heating units substantially coextensive in length with said walls arranged in close proximity thereto, and an adapter of heat conducting material approximating in size and shape to the open space of said channel, said adapter being removable from said channel to admit articles to be heated wide enough to span such space, and also being constructed to permit admission between itself and one of the heating units of an article insufficiently wide to span the space.

In testimony whereof I have affixed my signature.

EDWIN L. EMERSON.